March 15, 1966 D. M. KING 3,240,365

ARTICLE STORAGE AND HANDLING SYSTEM

Filed April 6, 1964 8 Sheets-Sheet 1

INVENTOR
DONALD MAYER KING

March 15, 1966 D. M. KING 3,240,365
ARTICLE STORAGE AND HANDLING SYSTEM
Filed April 6, 1964 8 Sheets-Sheet 4

March 15, 1966 D. M. KING 3,240,365
ARTICLE STORAGE AND HANDLING SYSTEM
Filed April 6, 1964 8 Sheets-Sheet 7

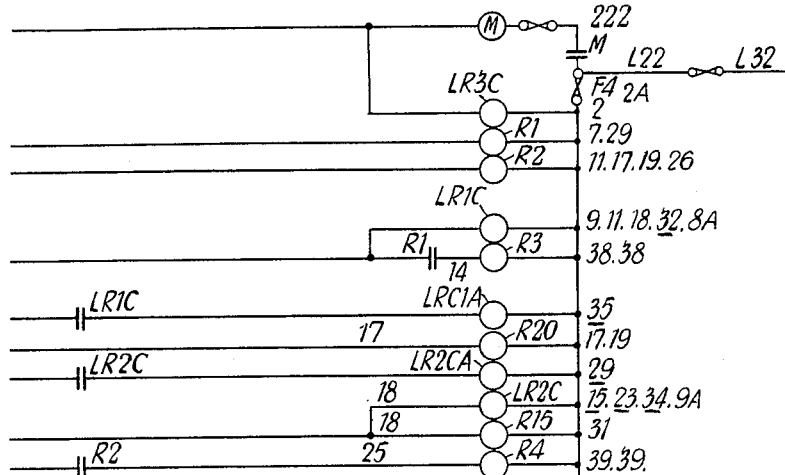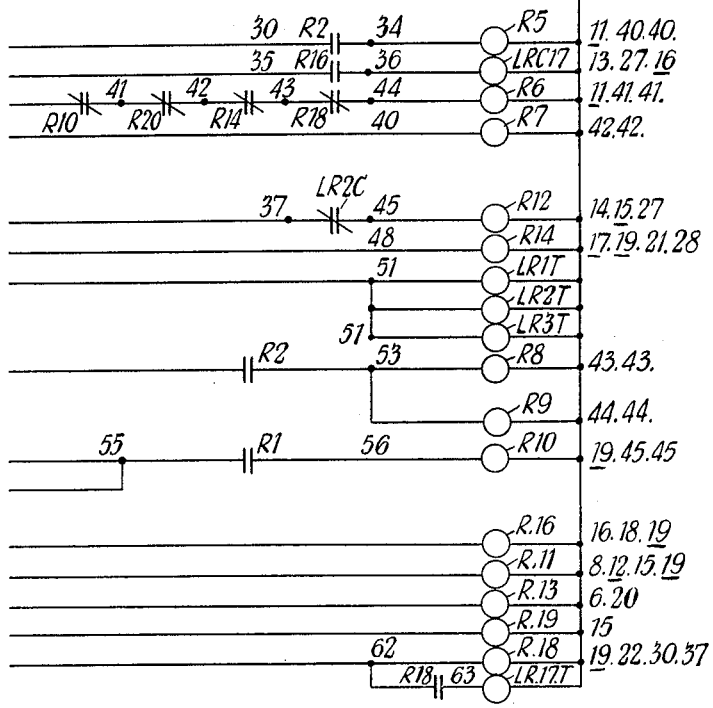
FIG.6.a

United States Patent Office 3,240,365
Patented Mar. 15, 1966

3,240,365
ARTICLE STORAGE AND HANDLING SYSTEM
Donald Mayer King, Argyle Works, Stevenage, England
Filed Apr. 6, 1964, Ser. No. 357,451
Claims priority, application Great Britain, Apr. 19, 1963, 10,925/63
7 Claims. (Cl. 214—16.4)

This invention relates to storage systems and more particularly to so-called mechanical strorage systems.

According to the present invention a mechanical storage system will comprise a rack including a plurality of vertical columns in side by side relationship each such column comprising a plurality of open ended cubicles or storage spaces which are disposed one on the other and are each adapted to accommodate a plurality of containers or load carriers arranged in line one behind the other and means whereby transfer of containers or carriers between any cubicle or storage space and a vertically over or underlying cubicle or space may be effected as and when required, the arrangement being such that as a result of one or more transfer operations any selected container or carrier may be brought into a position clear of the rack so that it may be loaded or off loaded.

In accordance with a further aspect a mechanical storage system will comprise a rack including at least two open ended cubicles or storage spaces disposed one vertically above the other and each adapted to accommodate a plurality of containers or load carriers arranged in line one behind the other and lift units disposed one at each side of the rack and including a lift platform capable of being positioned at the level of either cubicle or space as desired, the arrangement being such that with the platforms of the lift units aligned with one cubicle or storage space one of the containers or carriers present in the latter may be transferred to the platform of one of said units, as a result of appropriate displacement of the line of said containers or carriers, whereafter the lift units may be operated to bring their respective platforms into register with the second cubicle or storage space so that the container or carrier may then be transferred to the latter with a resultant displacement of the line of containers or carriers present therein such as will cause a container or carrier to be displaced on to the platform of the second lift unit so that on operation of the units to return the platforms into register with the first mentioned cubicle or space such container or carrier may thereafter be transferred to the latter.

In order that the said invention may be clearly understood and readily carried into effect reference will now be made to the accompanying drawings in which:—

Figure 3:
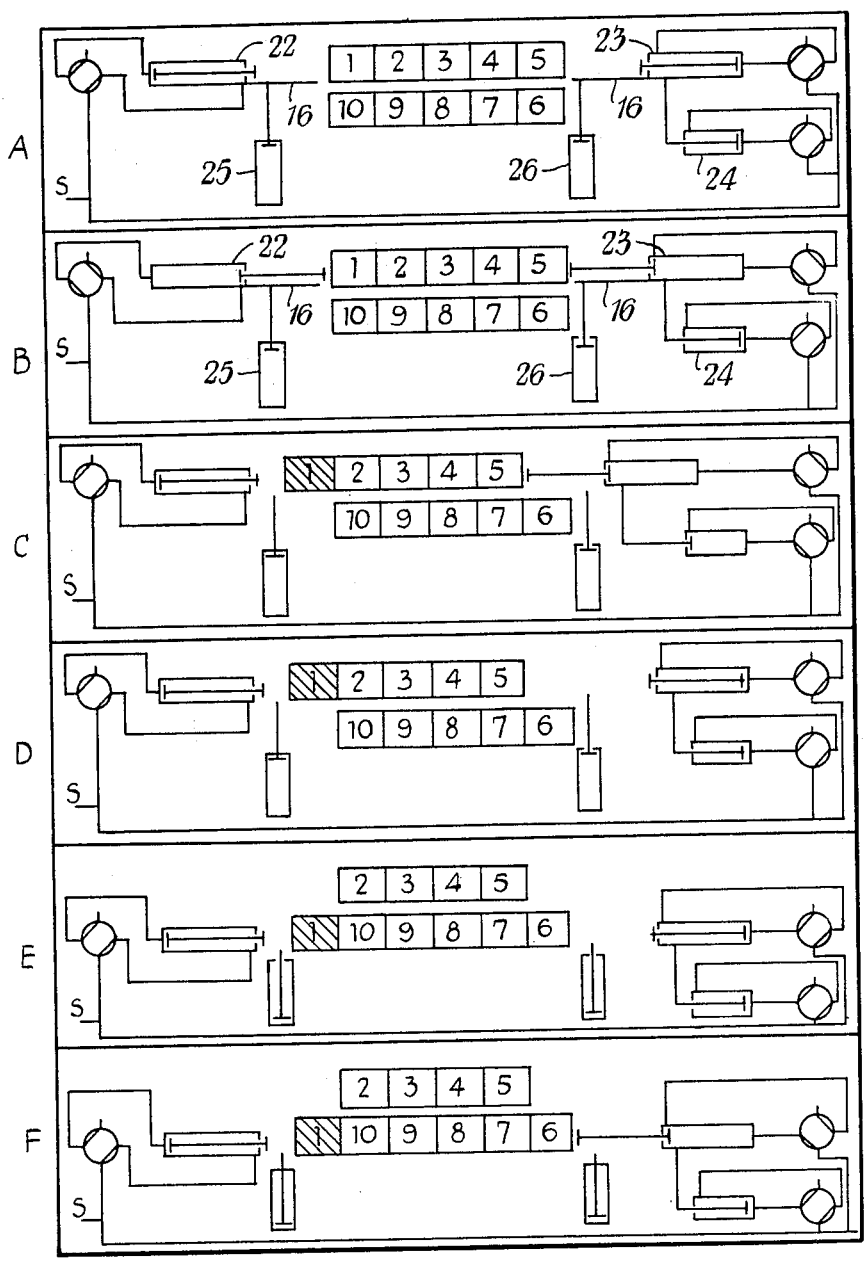
FIGURE 3 is a diagram illustrating part (operations A–F) of an operational sequence.
Figure 3A:
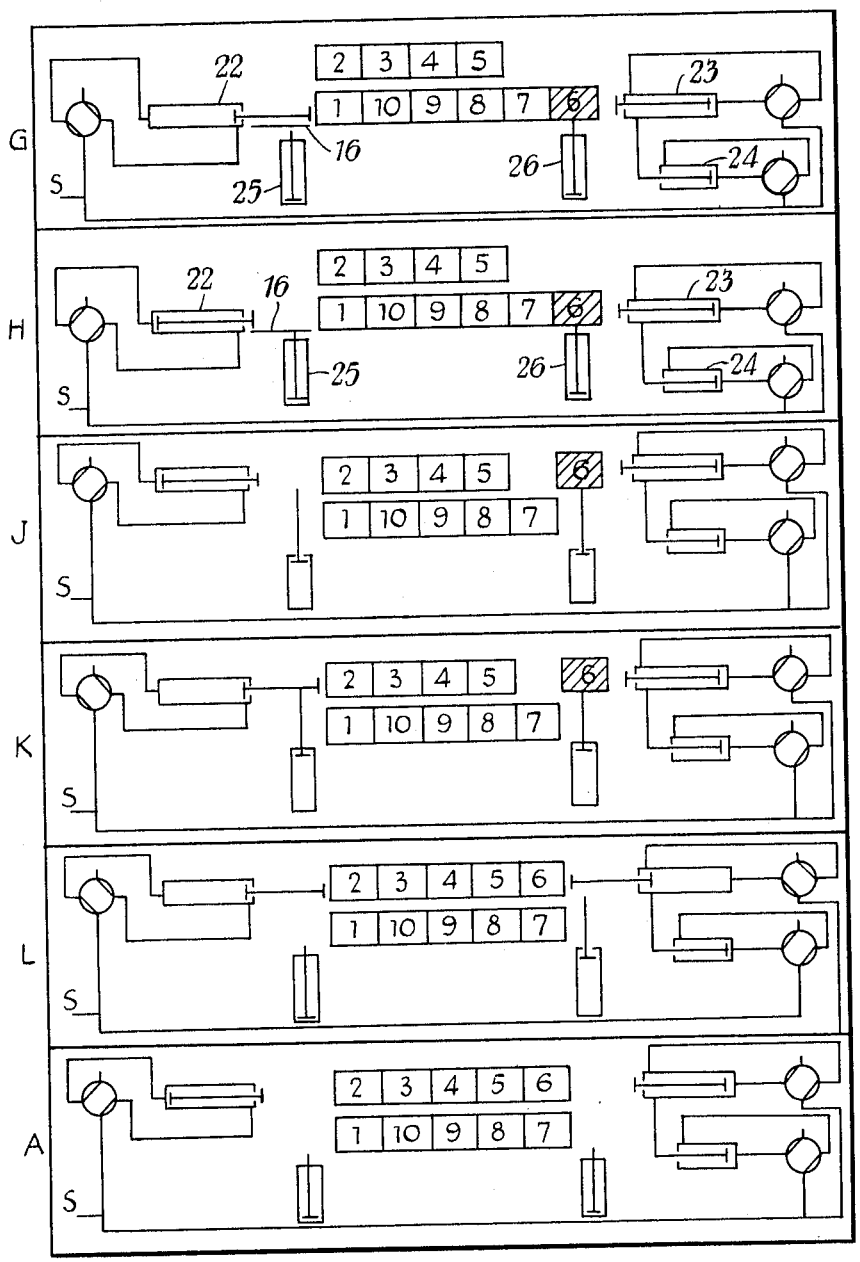
FIGURE 3(a) is a diagram illustrating the remaining portions (operations G–A) of the operational sequence partially depicted in FIGURE 3.
Figure 6:
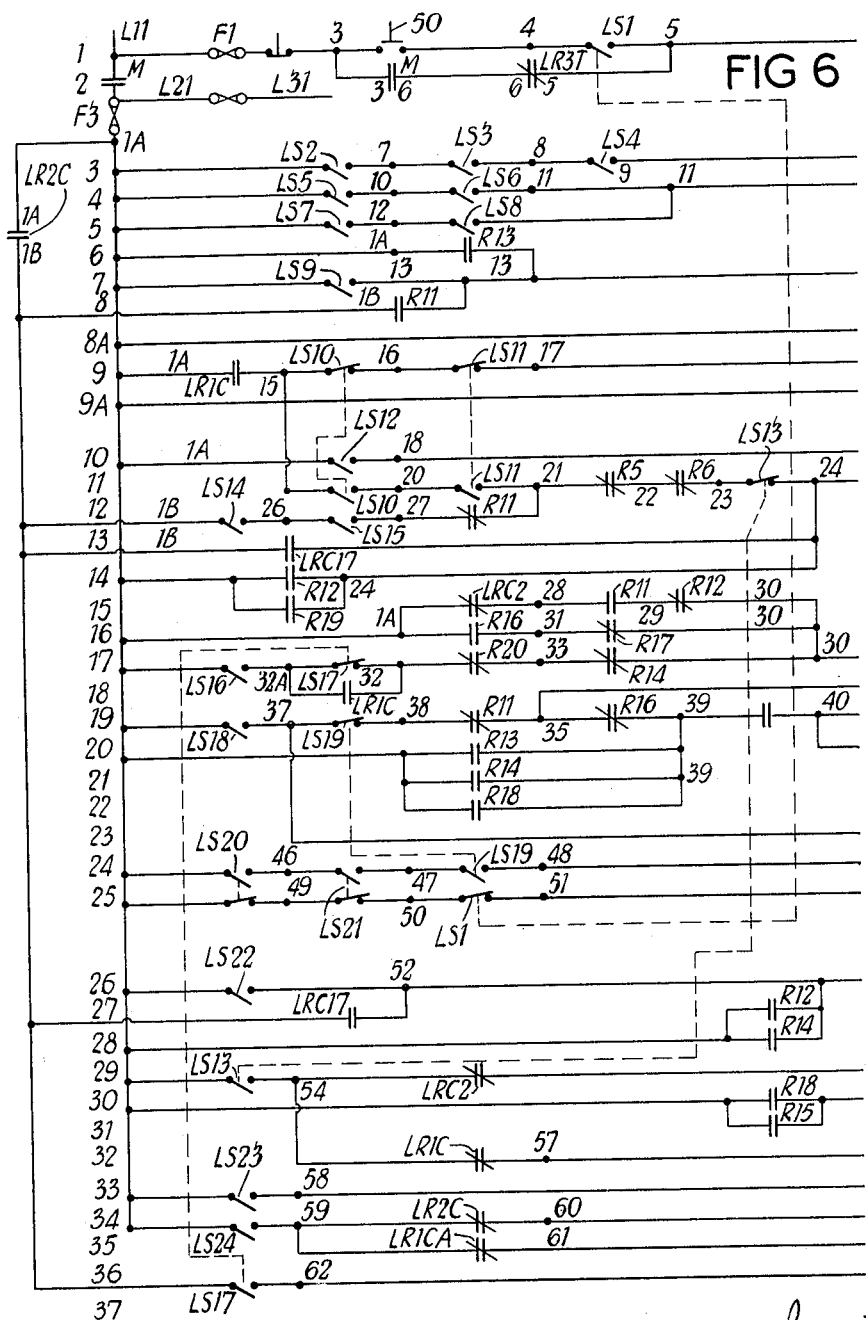

FIGURES 6 and 6(a), taken together, form an electrical circuit diagram applicable to a layout such as is indicated in FIGURES 3 and 3(a), FIGURE 6 comprising the lefthand portion of such diagram and FIGURE 6(a) comprising the righthand portion of the diagram.

Figure 1:
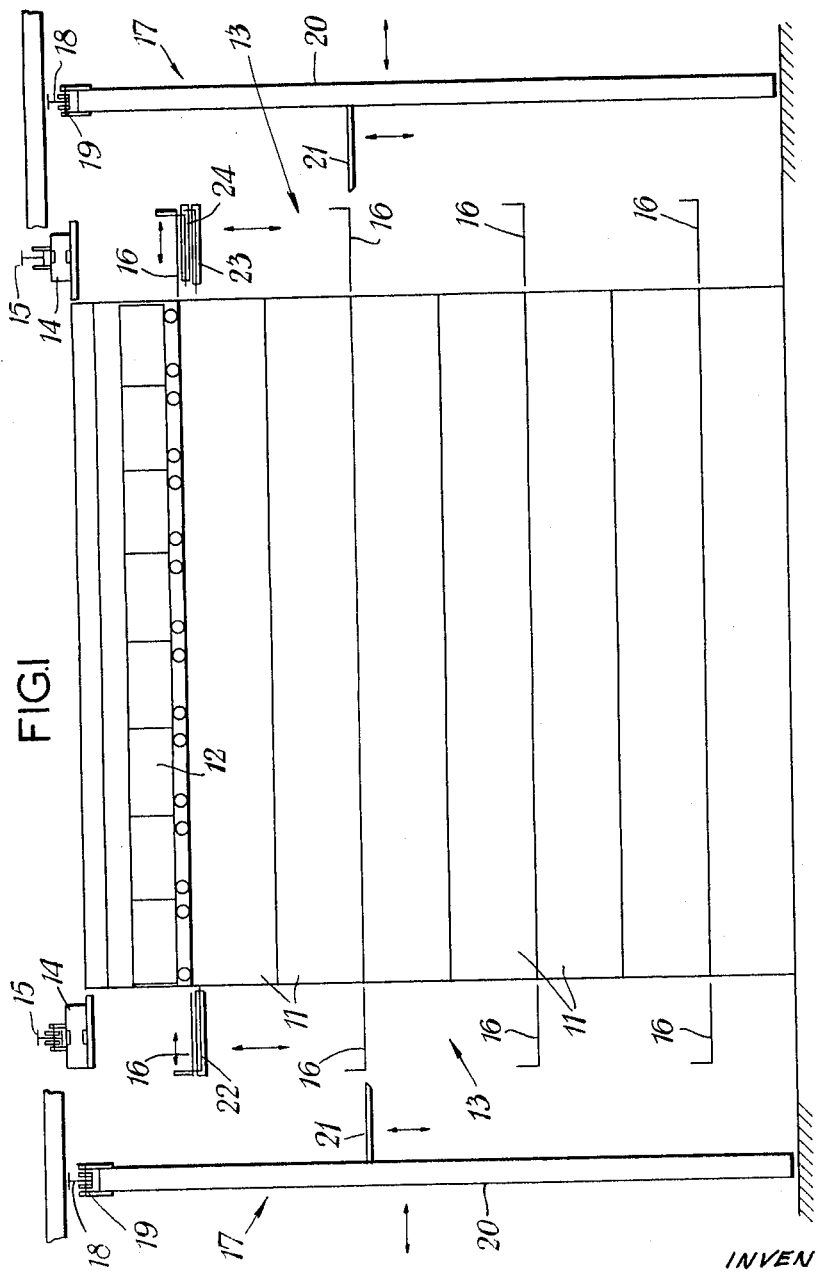
FIGURE 1 is a diagrammatic side elevational view of a storage system.
Figure 2:
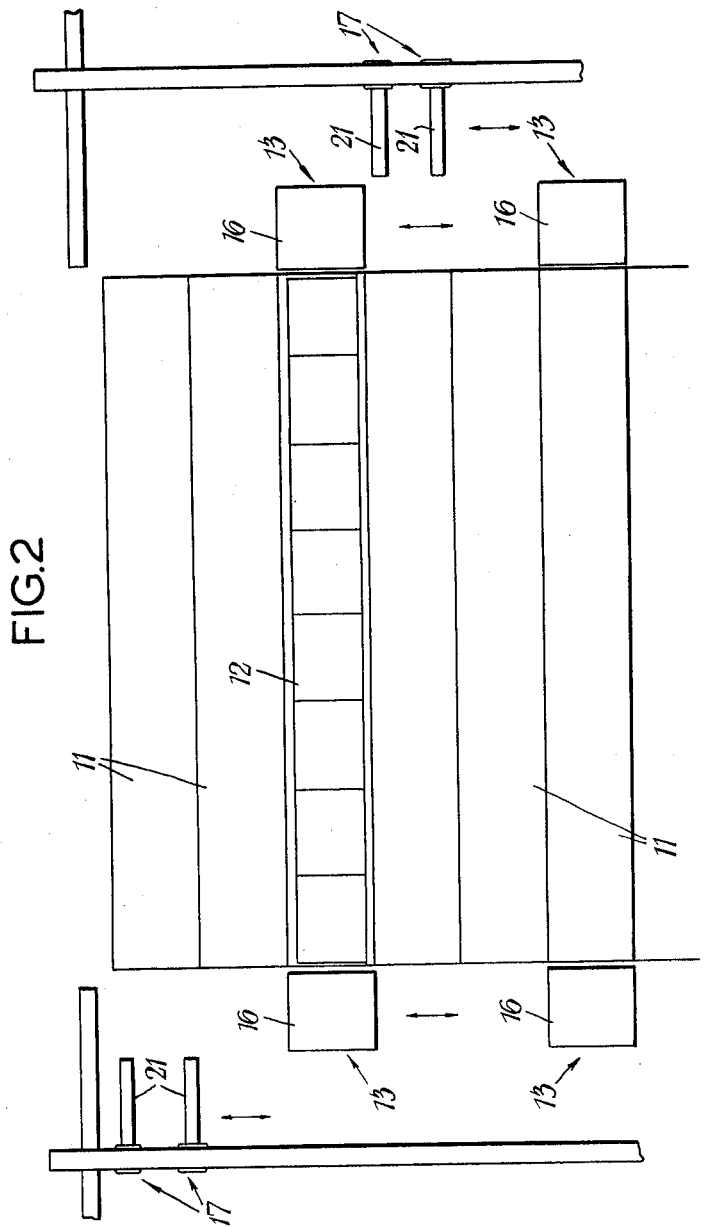
FIGURE 2 is a plan view of the system shown in FIGURE 1.

Referring now to the drawings and more particularly to FIGURES 1 and 2 there is shown a multi-storey storage rack which includes a plurality of cubicles or storage spaces 11 arranged in a series of vertical columns, such columns, which each consist of a number of cubicles or storage spaces superimposed one on the other being disposed in side by side relationship so that there are effectively a plurality of horizontal rows of cubicles or storage spaces which rows are disposed one on the other. Each cubicle or storage space 11 is open ended and extends through the rack from the front to the back thereof being designed to accommodate a predetermined number of wheeled tracks or stillages such as are indicated at 12, arranged nose to tail or one behind the other.

Disposed at each side or at the front and back of the rack so as to be movable back and forth along the face thereof into alignment with any selected vertical column of cubicles are lift units designated generally by 13. While there may be a single unit adjacent each side of the rack it will probably be convenient depending upon the size of the rack to employ two or even more and in the embodiment illustrated, as will be seen from FIGURE 2, two such lift units are provided at each side of said rack. In the embodiment illustrated in FIGURES 1 and 2 each lift unit comprises a mobile hoist unit 14 movable back and forth along a fixed overhead track 15. Suspended from the unit 14 is a plurality of platforms 16 disposed one above the other in predetermined spaced relationship, the arrangement being such that the platforms 16 will be movable upwardly and downwardly together as a unit. In the embodiment illustrated the rack comprises eight storeys and in such a case each lift unit comprises four platforms 16 which are so arranged that when said unit is in its uppermost position as shown a platform 16 will be aligned with each of the second, fourth, sixth and eighth storeys while when said lift unit is in its lowermost position the plaftorms will be aligned with the first, third, fifth and seventh storeys. It will be appreciated that with such an arrangement when the lift units at the front and back of the rack are aligned with a selected vertical column of cubicles or storage spaces it will be possible by appropriate actuation of such units to provide for transfer of trucks or stillages between the first and second storeys, the third and fourth, the fifth and sixth and the seventh and eighth storeys of the selected vertical column of the rack. Thus for example a truck or stillage may be taken from the front end of the second storey of a selected vertical column and transferred to the first storey while a corresponding truck of stillage may be taken from the rear end of the first storey and transferred to the second.

Lifting and lowering of the platforms 16 of each lift unit may as indicated above be effected by means of an electrically operated hoist unit or alternatively the requisite vertical movement may be effected through the medium of an hydraulic or pneumatically operated ram or the like.

In addition to the aforesaid lift units 13 it is also proposed to provide at each side of the storage rack a mobile stacking apparatus, each such apparatus which is designated generally by 17 in FIGURES 1 and 2 being adapted to travel along an overhead track 18 which is parallel to the path of movement of said lift units 13. Each stacker apparatus which is of known type comprises a mobile carriage 19 from which two parallel legs or masts 20 depend, such legs or masts being adapted to serve as guides for a load platform 21, the latter being movable upwardly and downwardly by means of a hoist unit (not shown) mounted on the aforesaid mobile carriage. The stacker apparatus will be employed for loading and off-loading the trucks or stillages. For example when a truck or stillage is present on one of the platforms 16 the appropriate stacker apparatus will be aligned with the lift unit concerned and its load platform 21 raised or lowered to bring it into alignment or register with that particular platform 16 thereby to allow for transfer of the truck or stillage to the platform 21 or transfer of loads to or from the truck or stillage. It will be appreciated that the stacker apparatus will be employed for lifting tracks or stillages or loads from ground or floor level to the level of any selected platform 16 of a lift unit or alternatively of lowering such trucks, stillages or loads from the level of any plaform to ground or floor level.

While the trucks or stillages could be moved along the cubicles or storage spaces 11 and transfer from and to the platforms 16 could be effected manually or through the medium of manually actuated means it is nevertheless proposed to effect the necessary movements through the medium of hydraulically or pneumatically operated rams and to this end each platform 16 of the lift unit or units disposed at the front of the rack (the left hand end as shown in FIGURES 1 and 2) is provided with a ram 22 while each platform 16 at the back of the rack is provided with two rams 23, 24.

For an understanding of how the apparatus is intended to function reference will now be made to FIGURE 3 which shows a complete cycle of operations.

In FIGURE 3 two lines of rows of trucks or stillages are shown which are designated by the numerals 1–10 inclusive such trucks or stillages being arranged five in an upper and five in a lower cubicle. It is also to be noted that in FIGURE 3 the platform 16 of the lift unit at each side of the rack is raised and lowered through the medium of an hydraulically or pneumatically operated ram such rams being designated 25 and 26 respectively.

In the position designated A the rams 25 and 26 are extended, the respective platforms 16 being aligned with the upper of the two cubicles concerned. On initiation of an operative cycle the rams 22 and 23 respectively at the front and back of the rack will, as indicated at B, be extended to centralise the upper line of trucks or stillages designated 1–5. At the next stage indicated at C the ram 22 will be retracted and the ram 24 extended thereby to impart a longitudinal movement to the upper line of trucks or stillages such as will bring the truck or stillage designated No. 1 on to the platform 16 of the front lift unit. At this point the rams 23 and 24 will be retracted as shown at D whereafter the rams 25 and 26 will be retracted to lower the respective platforms 16 into alignment with the lower cubicle as indicated at E. With the platforms 16 thus positioned the ram 23 will as indicated at F be extended to ensure accurate positioning of the lower line of trucks or stillages which now includes the additional truck or stillage designated No. 1, whereafter said ram 23 will be retracted and the ram 22 extended to move the lower line of trucks or stillages to the right as shown thereby to bring the truck or stillage designated No. 6 on the platform 16 of the rear lift unit as indicated at G. At that point the ram 22 will be retracted as indicated at H whereafter the rams 25 and 26 will again be extended to raise the platforms 16 back to the upper level as indicated at J. With the platforms 16 again at the upper level the ram 22 will be extended to form a stop as indicated at K whereafter the ram 23 will be operated as indicated at L to push the upper line of trucks or stillages to the left as shown whereafter said rams 22 and 23 will be retracted and the system will be restored to its initial position with the exception that the truck or stillage designated No. 1 will have been transferred to the lower level while the stillage designated No. 6 will then be located at the upper level.

It will be appreciated that by repeating the above cycle of operations an appropriate number of times it will be possible to bring any selected truck or stillage to a position on the lift unit at the front end of the cubicles or storage space in which it is stored and that when so positioned it may then be readily transferred on to a load platform 21 of one of the stacker devices. It will of course be obvious that if the selected truck or stillage is already at one or other end of a cubicle then there will be no need for any of the above operational sequences since it may be directly off-loaded on to the stacker device. It will be appreciated that instead of the cycle above described wherein movement is in effect anticlockwise as shown and the initial step is a displacement of the upper line of the stillages to the left as shown it would equally be possible to arrange for a clockwise movement and to commence at the lower level starting the cycle with a displacement of the lower line of trucks or stillages to the left as shown. The selection of the level at which to start will of course depend on the position of the truck or stillage which is to be selected.

Clearly the control of the rams 22, 23, 24 and also of the rams 25 and 26 to bring about the required sequence of operations could be effected through the medium of manually operated valves or like devices, but preferably means will be incorporated whereby the sequence of operations will be controlled automatically in such a manner that it will only be necessary for an operator, having selected the truck or stillage required, to set a selector device whereafter the operational sequences necessary to bring such selected truck or stillage to the required point will take place automatically.

Figure 4:
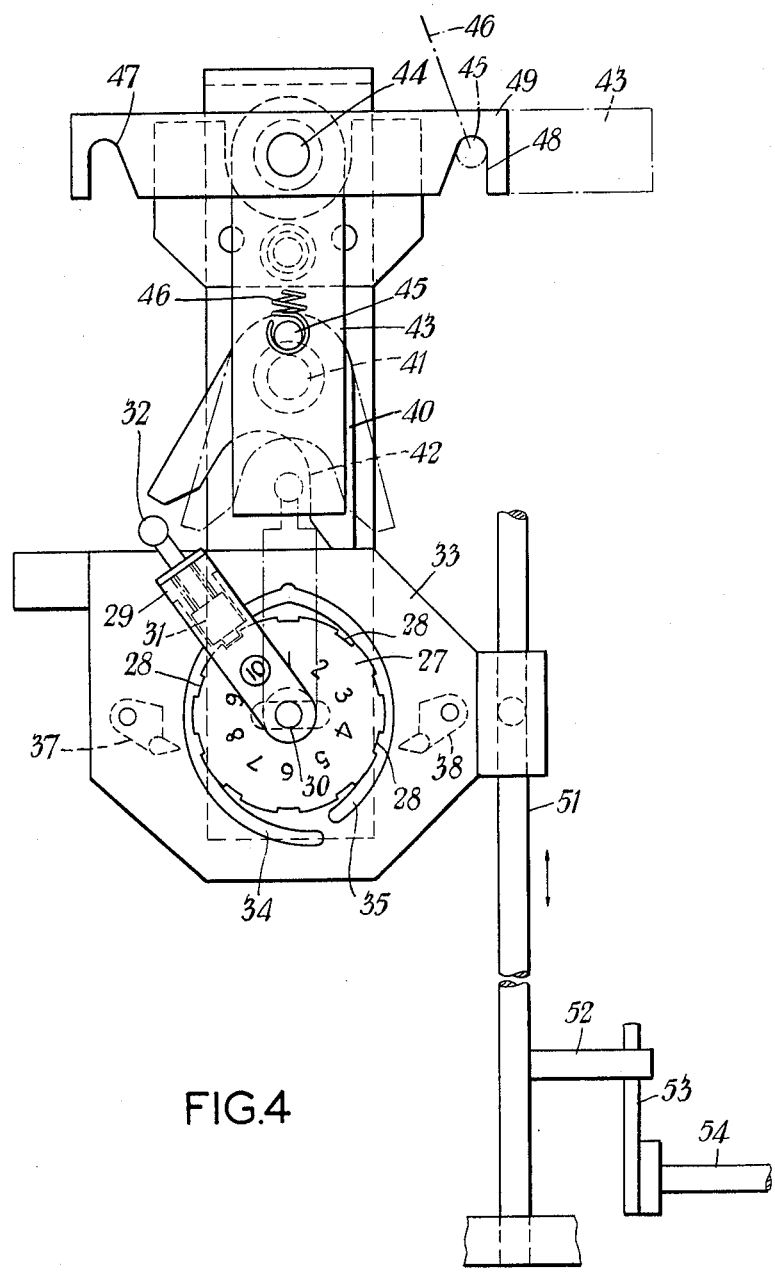
FIGURE 4 is a front view of a selector device.
Figure 5:
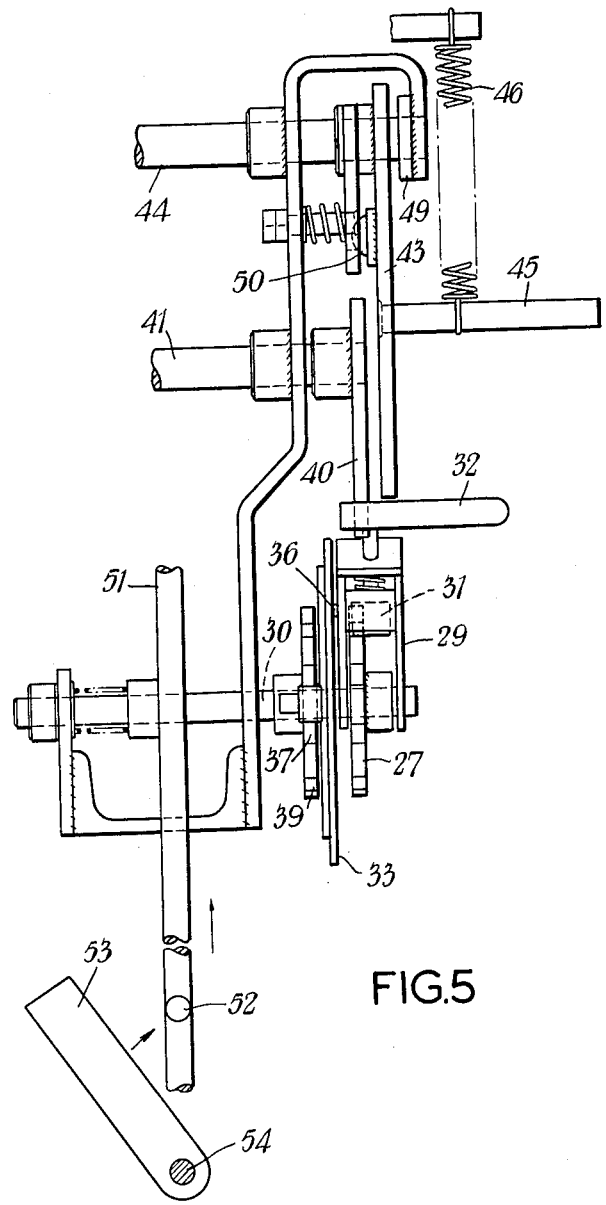
FIGURE 5 is a side view of the device shown in FIGURE 4.

One suitable form of selector device is illustrated by way of example in FIGURES 4 and 5 to which reference will now be made. The selector device illustrated in those figures is intended for use with a system such as is shown in FIGURE 3 i.e. wherein there are two storage levels each capable of accommodating five trucks or stillages. When installed the selector device will be located at the front of the rack, its presence being indicated by the letter S in FIGURE 3. Referring now to FIGURES 4 and 5, 27 denotes a disc which is mounted on a shaft 30 and is provided around its periphery with ten slots or recesses 28 each of which is, as clearly shown in FIG. 4, designated by a reference numeral, such numerals running from 1–10 and corresponding to the number of trucks or stillages in the storage system. If it be assumed that the storage system corresponds to that shown in FIGURE 3 then the numerals 1–5 will correspond to the trucks or stillages at the upper level while the numerals 6–10 will correspond to the trucks or stillages at the lower level. Cooperating with the disc 27 is a lever 29 of substantially inverted U shape movable angularly about the axis of the shaft 30 from an "at rest" or control position indicated in dotted lines in FIGURE 4 to any one of a plurality of set positions. Slidably mounted on the lever 29 is a spring pressed plunger element 31 having an operating handle 32 affixed thereto. The plunger element 31 is adapted to be engaged in any of the slots 28 in the periphery of the discs 27 and it will be appreciated that by retracting said plunger element to disengage it from a slot 28, it will be possible to move the lever 29 either clockwise or anticlockwise into a position wherein said plunger 31 may be engaged with a selected slot or recess 28 corresponding to the particular truck or stillage which it is required to bring to a position for off loading.

33 denotes a plate which is so arranged as to be capable of limited movement such plate being formed with two arcuate slots 34 and 35 the centres of curvature of such slots being displaced from the axis of rotational or angular movement of the lever 29. The lever 29 carries a peg 36 (see FIGURE 5) which is adapted to cooperate with the slots 34 and 35. If reference is made to FIGURE 4 it will be seen that if the lever 29 is swung in a clockwise direction so that the plunger 31 may be engaged with any of the recesses 28 designated Nos. 1–5 then the peg 36 will travel along the slot 35 with the result that the plate 33 will be displaced to the right as shown in FIGURE 4. On the other hand if the lever 29 is swung anti-clockwise to allow engagement of the plunger 31 with any of the recesses 28 designated Nos. 6–10 then the peg 36 will travel along the slot 34 with the result that the plate 33 will be displaced to the left as shown in FIGURE 4. Mounted on the rear face of the plate in 180° relationship are two pawls 37, 38 which are adapted to cooperate with a ratchet wheel 39 mounted on the shaft 30. Depending upon the level selected i.e. a truck or stillage from No. 1–No. 5 in the upper level or a truck or stillage from No. 6–No. 10 in the lower level, the lever 29 will be swung clockwise or anti-clockwise and if swung clockwise with a resultant movement of the plate 33 to the right then the arrangement is such that the left hand pawl as shown, i.e. the pawl 37, will actually engage the ratchet wheel 39 while if said lever 29 is swung anti-clockwise then the right hand pawl as shown i.e. the pawl 38 will engage said ratchet wheel 39.

The operating handle 32 and the upper end of the plunger 31 are adapted to cooperate with a lever 40 carried by a shaft 41 hereinafter termed the level selector shaft. As will be seen the lever 40 is formed at its lower end with a recess 42 of substantially inverted U shape. The arrangement is such that when the mechanism is at rest and the lever 29 is extending vertically upwardly as shown in dotted lines in FIGURE 4, the lever 40 will depend vertically downwardly as indicated in chain dotted lines with the result that the handle 32 and the upper end of the plunger 31 will be engaged in the aforesaid recess 42. It will be appreciated that when the operator makes a selection and moves the lever 29 either clockwise or anti-clockwise the lever 40 will, as a result of the engagement of the handle 32 in the recess 42, be moved angularly either to the right or left as shown. This angular movement of the lever 40 will result in a corresponding angular movement of the level selector shaft 41 which will in turn ensure appropriate operation of the system. It will be appreciated that after an initial angular movement of the lever 29 the handle 32 will pass out of the recess 42 of the lever 40.

43 denotes an on/off control lever which is mounted on a shaft 44 such lever being provided with an operating handle as indicated at 45. The control lever 43 is spring loaded by means of a spring 46 so that when it is moved from the dead centre or "on" position as shown in full lines in FIGURE 4 it will snap upwardly either to the left or right into an "off" position one of which is indicated in dotted lines in FIGURE 4. In the "off" position the handle 45 will be accommodated in one or other of two slots 47, 48 formed in a fixed or stationary stop bar or bracket 49. As will be clearly seen from FIGURE 5 the lever 43 carries at its rear face a spring pressed ball 50 by means of which it may be held resiliently in its "on" position.

Attached to the plate 33 is a rod 51 which carries an outwardly directed pawl 52 with which a lever 53 carried by a shaft 54 is adapted to cooperate. The arrangement is such that the shaft 54 will be moved angularly back and forth in dependence upon actuation of the ram 22. With each angular movement of the shaft 54 the lever 53 will cooperate with the pawl 52 so that a longitudinal movement will be imparted to the rod 51 with a resultant movement of the plate 33. With each angular movement of the plate 33 one or other of the pawls 37, 38 (depending upon the setting of said plate resultant upon setting of the lever 29) will actuate the ratchet wheel 39 and thus cause an angular movement of the shaft 30 and hence of the disc 27.

The selector device above described is adapted to operate in the following manner:

The operator will select the particular truck or stillage which is required and will then if necessary set the disc 27 so that the number thereon in the top centre position will correspond to the number of the truck or stillage then at the front end of the cubicle at the selected level. In the present case the truck or stillage designated 1 in FIGURE 3 is at the front end of the upper level and hence the disc 27 is set as shown in FIGURE 4 with the numeral 1 in the top centre position. Were the truck or stillage numbered say 4 at the front end of the cubicle then the disc 27 would be set so that the number 4 was in the top centre position. With the disc 27 appropriately set the lever 29 will then be set to the number on the disc 27 corresponding to the selected truck or stillage. As a result of such setting operation the plate 33 will be moved either to the left or to the right thereby to bring one or other of the pawls 37, 38 into engagement with the ratchet wheel 39 and at the same time the lever 40 will be swung either to the left or right to ensure selection of the level i.e. either upper or lower at which the operational sequence is required to start. At this point the control lever 43 will be swung downwardly into its operative or "on" position as shown in full lines in the drawing whereupon the control system will be set for operation. As a result of operation of the system the rod 51 will be actuated at appropriate stages in the cycle of operations thereby to impart a succession of movements to the plate 33 and thence by way of the pawl 37 or 38 to the ratchet wheel 39, to the shaft 30 and the disc 27. The movements imparted to the disc 27 and hence to the lever 29, which is coupled thereto by reason of the engagement of the plunger 31 with the appropriate recess 28 in said disc, will be in the reverse direction to that in which said lever 29 was moved originally so that during an operative sequence said lever 29 will be moved step by step back towards its initial or vertically upright position as shown. The arrangement is such that when the lever 29 is actually restored to its initial position the requisite operational sequence will have been completed and the selected track or stillage will be brought to a position for off loading. As the lever 29 moves into its initial position it will cooperate again with the lever 40 and restore the latter to its central position while at the same time it will also displace the control lever 43 from its "on" position so that said lever 43 will be snapped by reason of its spring 46 into one or other of its "off" positions. The position of the lever 43 at the conclusion of each operational sequence i.e. whether the handle is in engagement with the slot 47 or 48, will serve as an indication of the operation which has been completed i.e. whether the truck or stillage concerned was at the upper or lower level.

FIGURE 6 is an electrical circuit diagram applicable to the storage system shown in FIGURE 3 in relation to which latter it (FIGURE 6) will now be described, it being borne in mind that the system of FIGURE 3 is equipped with a selector device of the kind illustrated in FIGURES 4 and 5.

As will be seen the electrical circuit includes a plurality of limit switches which will be associated with various parts of the equipment. The ram 22 on the lifting unit at the front of the rack will be arranged to actuate the switch LS2 when retracted and switches LS16 and LS20 when extended. The ram 23 on the lift unit at the rear of the rack will actuate the switch LS23 when retracted and the switches LS18 and LS21 when extended while the ram 24 will actuate the limit switch LS4 when retracted and switch LS22 when extended. The vertical ram 25 will actuate the limit switches LS5, LS10 when extended and the switches LS7 and LS16 when retracted while the vertical ram 26 will actuate the switches LS6, and LS11 when extended and the switches LS8, LS15 when retracted. The selector device will control limit switches LS1, LS9, LS12 and LS19, the switch LS1 being closed to start the cycle as a result of movement of the lever 43 into its "on" position while the switches LS9 and LS12 are controlled as a result of actuation of the lever 40 and of the level selector shaft 41. The switch LS19 will be actuated at the end of the cycle by means of the "on/off" conrol. The remaining limit switches LS13, LS17, LS24 and LS23 will be actuated by a truck or stillage on the lift unit the switch LS13 being actuated when vertical ram 25 is fully extended and the switch LS23 being actuated when said ram is retracted while the switch LS17 is actuated when the vertical ram 26 is extended and the switch LS24 when said ram 26 is retracted.

The electrical circuit illustrated in FIGURE 6 is arranged so that either the upper or lower level must be selected before a startbutton 50 is rendered operational and this is effected by virtue of the provision of the limit switch LS1 which is connected in series with the start button and is as indicated above controlled by the selector device. With the selector finally set and the switch LS1 closed depression of the start button 50 will bring in M and a latch relay LR3C which will then be maintained via their own contacts. To prevent any possibility of the vertical rams 25, 26 operating at the same time as the horizontally directed rams 22, 23 and 24 on the lift units at the front and back of the rack, relays R1 and R2 have been introduced and arranged to operate as interlocks. It is only when the limit switches LS2, LS3 and LS4 are held closed as a result of retraction of their respective horizontal rams 22, 23 and 24 that the vertical rams 25 and 26 can be made operative. There is similar safety lock to prevent actuation of the horizontal rams 22, 23 and 24 only being operable when either the switches LS5 and LS6 are held closed at the top position of the rams 25, 26 or when the switches LS7 and LS 8 are closed and when said rams 25 and 26 are in the bottom or retracted position.

When making a selection from the upper level the limit switch LS9 is closed as a result of operation of the lever 40 and shaft 41 of the selector mechanism and closure of LS9 will bring in a latch relay LRC1 and the relay R3. As a result of bringing in relay R3 the vertical cams will be positioned in the top position as shown at A in FIGURE 2. The contacts of the latch relay LRC1 will bring in latch relay LRC1A and also relay R20 via the limit switches LS10 and LS11 which will be closed when said rams 25 and 26 are at the top position. Closure of the limit switches LS10 and LS11 brings in relay R4 as a result of which the ram 22 will be extended. On completion of its outward stroke the ram 22 will close the limit switch LS16 which will bring in relay R5 with the result that the ram 23 will be extended. Upon completion of its stroke the ram 23 will close the switch LS18 which will bring in relays R6 and R7. The relay R6 is effective to cause extension of the ram 24 while the relay R7 is effective to cause retraction of the ram 22. On completion of its outward stroke the ram 24 will close the limit switch LS22 which will bring in relays R8, and R9, R8 being effective to cause retraction of the ram 23 and R9 retraction of the ram 24.

When the rams 23 and 24 are extended the leading truck or stillage designated No. 1 in FIGURE 3 will be pushed on to the lift unit (vertical ram 25) which will close the limit switch LS13 bringing in a relay R10 which will cause the rams 25 and 26 to be lowered upon completion of the retractive strokes of the horizontal rams with resultant closure of limit switches LS2, LS3 and LS4. Upon being fully lowered the rams 25 and 26 will close the limit switch LS23 which brings in a relay R11 causing the relay R5 to become re-energised thereby to effect extension of the ram 23. When fully extended the ram 23 will close the limit switch LS18 thereby to bring in a relay 12 which again brings in relay R4 to cause extension of the ram 22 whilst another contact of R12 brings in relay R8 thereby to cause retraction of the ram 23. Upon extension of the ram 22 the truck or stillage designated No. 6 at the rear end of the lower cubicle will be pushed on the rear lift unit (ram 26) and will actuate limit switch LS24 which will close relay R13, a contact of R13 bringing in the relay R7 thereby to cause retraction of the ram 22. Another contact on the relay R13 also closes at this time thereby to bring in the relay R3 with the result that the rams 25 and 26 will again be extended. Upon completion of their upward strokes the rams 25 and 26 will close the limit switches LS10 and LS11, which will bring in the relay R4 with resultant extension of the ram 22. Upon completion of its stroke the ram 22 will close the limit switch LS16 which will again bring in relay R5 to effect extension of the ram 23. The attainment of this condition which is illustrated at L in FIGURE 3 constitutes the completion of a cycle and depending upon the position of the truck or stillage required so an appropriate number of cycles such as that indicated above will be repeated. The number of cycles is recorded by the selector device i.e. by the angular movements of the disc 27 and when the correct number have been completed i.e. when the lever 29 attains the top centre position the apparatus will be stopped.

Assuming that the requisite number of cycles has been completed then operational sequence will be stopped in the following manner.

Upon the final extension of the ram 22 the limit switches LS1 and LS19 will be changed over i.e. dropped out as a result of restoration of the on/off lever to its "off" position. At the same time a relay R14 will be brought in to stop the relay R6 from operating and causing extension of the ram 24. An open contact on the relay R14 will also be effective to close the relay R8 thereby to effect retraction of the ram 23 while a further contact of R14 will bring in R7 thereby to effect retraction of the ram 22. With the rams 22 and 23 fully retracted the limit switches LS20 and LS21 will be closed thereby to effect tripping of the relays LR1T, LR2T and LR3T and stoppage of the cycle.

In the foregoing description it has been assumed that the upper level was selected but selection may of course equally well be made from the lower level in which case the sequence will be as follows.

As indicated above upon selection of the bottom level the selector device will be appropriately set, with resultant actuation of the lever 40 and the level selector shaft 41. Upon such selection the limit switch LS14 will be closed thereby to bring in relay R15 and latch relay LR2C. The relay R15 will be effective to close the relay R10 thereby to bring the vertical rams 25 and 26 to the lower level. When the rams 25 and 26 are fully retracted the switches LS15 and LS16 will be closed thereby to bring in the relay R5 with resultant extension of the ram 23. Upon extension of the ram 23 the limit switch LS18 will be actuated to bring in relays R6 and R7, R6 causing extension of the ram 24 and R7 retraction of the ram 22. When the ram 24 is extended it actuates the limit switch LS22 which in turn operates the relays R8 and R9 with resultant retraction of the rams 23 and 24. When the ram 23 is extended it pushes the leading truck or stillage (i.e. that designated 10 at A in FIGURE 3) on to the lift unit (ram 25) thereby closing limit switch LS23 which brings in the relay R11, a contact of R11 also bringing in the relay R3 thereby to cause extension of the rams 25 and 26. Upon completion of their upward stroke the rams 25 and 26 will close the limit switch LS13 and hence the relay R16. A contact of the relay R16 will bring in the relay R5 which will cause extension of the ram 23. When fully extended ram 23 will operate the limit switch LS18 which will bring in latch relay LRC17 and relay R7. The actuation of the latch relay LRC17 will cause extension of the ram 22 while R7 will cause its retraction. A contact of LRC17 will bring in relay R8 thereby to cause retraction of the ram 23. When the ram 22 is extended it will push the upper row of trucks or stillages so that the rearmost will be positioned on the rear lift unit (vertical ram 26). At this stage the limit switch LS7 will be closed thereby to bring in relay R18 and to trip out latch relay LR17C. A contact of the relay R18 causes closure of the relay R10 with resultant lowering of the rams 25 and 26. Upon full retraction of the vertical rams 25, 26 the truck or stillage then on the rear lift unit (vertical ram 26) will close the limit switch LS24 which results in closure of relay R19, a contact of which latter will effect closure of the relay R4 with the resultant extension of the ram 22. Extension of the ram 22 will cause closure of the limit switch LS16 which in turn will close the relay R5 thereby to cause extension of the ram 23.

This completes a cycle and, as before, depending upon the position of the selected truck or stillage an appropriate number of such cycles will be repeated until the selected truck or stillage is brought to the required position.

Upon completion of the hole operation the last extension of the ram 22 will effect actuation of the limit switch LS19 and bringing in of the relay R14. A contact of the relay R14 will bring in the relay R7 thereby to cause retraction of the ram 22, while another contact of R14 will bring in relay R8 thereby to cause retraction of the ram 23. When so retracted the rams 22 and 23 will hold the limit switches LS20 and LS21 closed and that will trip the latch relays LR1T, LR2T and LR3T which will cut out M and LR3C and effect a stoppage of operations.

In the system above described and illustrated it has been assumed that the trucks or stillages in each cubicle or storage space will not be connected together in any way and hence in order to obtain the necessary movements of said trucks or stillages it is necessary to provide horizontal rams, such as 22, 23 and 24, on the platforms of the lift units, at both the front and back of the rack. If, however, provisions were made for the trucks or stillages to be coupled together when in a cubicle or storage space then it would be possible by pushing or pulling the leading truck or cubicle or any cubicle or space to impart the necessary movements to all of the trucks or stillages in that cubicle or space and in such circumstances it would only be necessary to provide rams or equivalent devices on the lift units at one side of the rack, i.e., either on the lift units at the front or back. If provision were made for coupling of the trucks or stillages then the coupling devices would be of such a nature that coupling or uncoupling of any two adjacent trucks or stillages would be effected as a result of relative vertical movement between such trucks or stillages. For example each truck or stillage might be fitted at one end with a projection of substantially T shape in plan and at the other with a pair of brackets which when viewed in plan are substantially L shape, such brackets being oppositely arranged and spaced apart so that the horizontal legs or limbs of the L's will be directed inwardly or towards each other, their free inner ends being spaced sufficiently to accommodate the vertical limb or leg of the T-shaped projection on an adjacent truck or stillage. With such an arrangement the cross member of the T-shaped projection at the end of one truck or stillage may be engaged behind the inwardly directed legs or limbs of the L-shaped brackets at the end of the next adjacent truck or stillage, engagement or disengagement being effected as a result of relative vertical movement between the truck or stillages such as would occur when a truck or stillage is present in the platform of a lift unit and the latter is moved into or away from the level of a cubicle or storage space.

It may be mentioned here that while it is envisaged that all of the platforms of a lift unit shall be movable together as a unit it may be desirable in certain cases to provide for independent movement of one or more of such platforms or alternatively so to construct the units that while the platforms are movable together as a unit the extent of travel may be varied so as to allow transfer between say first and third, fourth or any other storey as required.

If desired it may be feasible to dispose storage racks one behind the other the spacing between the rear face of the front rack and the forward face of the rear rack being such as only to accommodate one or more lift units therebetween. With such an arrangement the mobile stacker apparatus would be disposed at the front of the front rack and at the rear of the rearmost rack, the arrangement being such that trucks or stillages may be transferred from one rack to the other as required the rear rack or racks constituting a reserve rack or racks. Furthermore instead of wheeled trucks or stillages it may be desirable to employ trays, palettes or the like which may be wheeled or not and each of which is adapted to support a bin or container the latter being removable and replaceable at will from or onto such a tray, palette or the like.

What is claimed is:

1. A mechanical storage system comprising a rack having at least two open ended cubicles or storage spaces disposed one vertically above the other, each of said cubicles adapted to accommodate a plurality of containers or load carriers arranged in line one behind the other, lift units disposed one at each side of the rack including a lift platform capable of being positioned at the level of either cubicle or space as desired, said platforms being alignable with the cubicle and adapted to receive a container or load carrier from one of said cubicles, at least one ram carried by each of said platforms, control means to operate the rams simultaneously and gradually toward each other to compact the containers or load carriers within the adjacent cubicle whereby each container or load carrier is in engagement with each adjacent container or load carrier to prevent shifting or shunting of the contents thereof during subsequent longitudinal movements, said rams being operable to effect displacement of the line of said containers or load carriers within said cubicle so that one of said containers or carriers may be transferred to the first of said platforms, said lift units also including means operable to bring the respective platforms into register with the second of said vertically disposed cubicles, said rams being further operable to effect displacement of the line of containers or load carriers present within said second cubicle so that the container on said lift platform may be transferred to said second cubicle and the container or load carrier on the opposite end of the line within said second cubicle may be transferred onto the second lift platform for transfer to said first cubicle.

2. A mechanical storage system comprising a rack having a plurality of open-ended cubicles or storage spaces disposed one vertically above the other, each of said cubicles adapted to accommodate a plurality of containers or load carriers arranged in line one behind the other, lift units disposed one at each side of the rack including a lift platform capable of being positioned at the level of any cubicle or space as desired, said platforms being alignable with the cubicle and adapted to receive a container or load carrier from one of said cubicles, at least one ram carried by each of said platforms and operable to effect displacement of the line of said containers or load carriers within said cubicle so that one of said containers or carriers may be transferred to the first of said platforms, said lift units also including means operable to bring the respective platforms into register with the second of said vertically disposed cubicles, said rams being further operable to effect displacement of the line of containers or load carriers present within said second cubicle so that the container on said lift platform may be transferred to said second cubicle and the container or load carrier on the opposite end of the line within said second cubicle may be transferred onto the second lift platform for transfer to said first cubicle, means for effecting automatic operation, in a predetermined sequence, of the rams for raising and lowering of the lift platforms and of the ram means on said platforms for effecting displacement of the containers or load carriers, said last-named means comprising a selector device capable of being set to insure a predetermined number of operational cycles which result in a selected container or load carrier being brought automatically to a loading or off-loading position, said selector device comprising a control arm or lever capable of being moved angularly about a fixed axis from an initial position into a second position fixed in relation to an indicator disc so that it will register with a numeral or indicator on said disc corresponding to the container or carrier required, a ratchet wheel coupled to said disc, pawl means adapted as a result of setting of said control arm or lever to engage said ratchet wheel and means adapted also as a result of setting of said arm or lever to actuate level selection means to correspond to the level of the cubicle or space in which the selected container or load carrier is present, the arrangement being such that with each operational cycle the pawl means will be caused to apply an angular movement to the ratchet wheel thereby progressively to move the arm or lever back to its initial position at which point the requisite cycle or number of cycles will have been completed.

3. A mechanical storage system as in claim 2 in which the pawl means comprise two pawls which are carried by a member disposed in a plane parallel to the ratchet wheel and are so arranged as to be diametrically opposed in relation said wheel the arrangement being such that when the control arm or lever is moved into register with a numeral or indication on the disc the member will be displaced to cause one or other of the pawls to be moved into engagement with the ratchet wheel depending upon the level at which the selected container or carrier is located.

4. A mechanical storage system as in claim 3 in which means are provided whereby appropriate angular motions will be imparted to the member thereby to cause the selected pawl to be operative to impart the requisite angular movements to the ratchel wheel.

5. A mechanical storage system as in claim 2 in which the disc is provided around its periphery with a plurality of slots or recesses corresponding one to each of the numerals or indications on the disc while the control arm or lever is provided with a spring loaded plunger or the like adapted on setting of said arm or lever to be engaged with the appropriate slot or recess in said disc thereby positively to lock said arm or lever in relation thereto.

6. A mechanical storage system as in claim 2 wherein the level selector means comprise a shaft supported for rotational movement about its longitudinal axis and carrying a selector arm with which the control arm or lever is adapted to cooperate, the arrangement being such that movement of the control arm or lever from its initial position will result in an appropriate angular movement of the selector arm and hence of the shaft.

7. A mechanical storage system as in claim 2 in which the control arm or lever is adapted when restored to its initial position to trip a control lever adapted to cut off the operational sequence.

References Cited by the Examiner

UNITED STATES PATENTS

| 1,577,589 | 3/1926 | Rapp | 214—16.14 |
| 1,876,171 | 9/1932 | Rosener | 214—16.42 X |
| 2,028,476 | 1/1936 | Rome et al. | 214—16.14 |
| 2,095,151 | 10/1937 | O'Connor et al. | 214—16.14 |
| 2,569,393 | 9/1951 | Walker | 214—16.14 |
| 2,675,134 | 4/1954 | Becker | 214—16.42 |
| 2,714,456 | 8/1955 | Manaugh | 214—16.18 |
| 2,856,082 | 10/1958 | Foster et al. | 214—16.14 |
| 2,916,168 | 12/1959 | Coursey | 214—16.14 |
| 3,032,212 | 5/1962 | Gaskin et al. | 214—16.14 |

GERALD M. FORLENZA, *Primary Examiner.*

HUGO O. SCHULZ, *Examiner.*